United States Patent [19]

Welch

[11] 3,996,718
[45] Dec. 14, 1976

[54] FASTENING APPARATUS FOR PANELS
[75] Inventor: R. Montgomery Welch, Grand Rapids, Mich.
[73] Assignee: Modular Systems, Inc., Fruitport, Mich.
[22] Filed: July 28, 1975
[21] Appl. No.: 599,713
[52] U.S. Cl. .................................. 52/756; 52/285; 52/582
[51] Int. Cl.² .......................................... F16B 5/06
[58] Field of Search ............... 52/753 D, 754, 756, 52/582, 753 C, 284, 285, 585

[56] References Cited
UNITED STATES PATENTS

| 3,239,988 | 3/1966 | Meyer | 52/718 |
| 3,491,820 | 1/1970 | Ostling | 52/756 X |
| 3,755,979 | 9/1973 | Pantazi | 52/582 X |

FOREIGN PATENTS OR APPLICATIONS

| 1,349,422 | 12/1963 | France | 52/582 |

Primary Examiner—Wayne L. Shedd
Attorney, Agent, or Firm—Price, Heneveld, Huizenga & Cooper

[57] ABSTRACT

The specification discloses a joint structure for securing panel members tightly together wherein the joining apparatus is concealed from view after assembly and the panel members are prevented from skewing with respect to one another during assembly. The structure includes a clip on one panel, the clip having a raised section with a slot engaging the head of a stud mounted in a recessed area of another panel. The recess walls guide the protruding clip for engagement with the stud to prevent skew. In one arrangement, the clip includes openings to either end of the slot therein to allow use in combination with a second clip such that the stud will pass completely through the one clip before coming to rest in the other clip.

14 Claims, 14 Drawing Figures

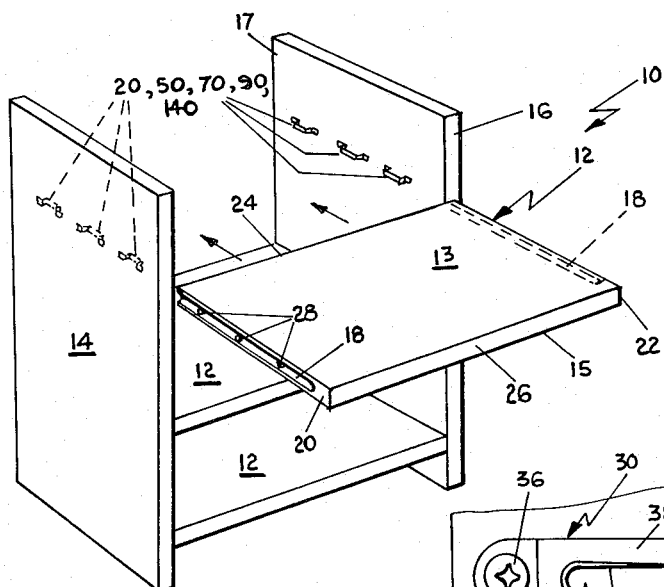

3,996,718

FASTENING APPARATUS FOR PANELS

BACKGROUND OF THE INVENTION

This invention relates to fastening systems for furniture, and, more particularly, to an easily assembled, concealed joint system for joining together shelving and other furniture panels and members.

Of the conventionally known systems and apparatus for joining together shelving and other furniture members, two types are disclosed in U.S. Pat. No. 3,491,820, invented by E. J. Ostling, entitled FLEXIBLE JOINT STRUCTURE AND CLIPS THEREFOR and U.S. Pat. No. 3,634,983 invented by Philip Craig Welch and entitled BOOTH CONSTRUCTION. Both of these patents are owned by the same assignee of the present invention.

Generally, the above furniture systems include short, separate recessed areas along the edges of furniture members to be joined together. Individual clips are mounted completely within the separate, recessed areas and engage enlarged heads of screws projecting into recessed areas beyond an opposing surface. In certain instances, for assembly purposes, each of the recessed areas include a lateral opening or "window" adjacent the side of the clip through which the screw head is passed for engagement with the clip.

In some finished furniture assemblies, it is desirable to eliminate such "windows" because provision of adequate covering for such openings is often difficult. Yet, assembly of shelves or other furniture members including such prior-known clips cannot be completed without such lateral openings, especially where the supporting members for the shelf or shelves are spaced at preset distances and cannot be moved apart from one another for insertion of the screw head in the recess.

Another problem encountered with prior known furniture systems of types other than that mentioned above is the skewing of the shelf or other furniture member with respect to its supporting panels during assembly. In instances where the shelf is moved into place between supporting panels in order to engage joint hardware for retention of the shelf, the shelf often pivots or skews with respect to its final position when sufficient force is applied to fully engage the joint hardware. Such pivoting or skewing not only detracts from one's ability to quickly assemble such furniture but can also cause damage to the furniture portions being assembled.

The present invention overcomes the above problems by providing a concealed joint system for furniture allowing assembly of one member between other members spaced at preset distances while skewing or pivoting during assembly is reduced or prevented.

SUMMARY OF THE INVENTION

Accordingly, the present invention provides a fastening apparatus or joint structure for joining furniture portions such as shelves, panels, and other members to supporting members wherein the joint structure is concealed from view following assembly. During assembly, the joint structure guides the shelves, panels, or the like to reduce skewing or pivoting of the shelf or panel with respect to its supporting structure to ease assembly and prevent damage.

The joint structure includes one furniture member having an elongated, continuous recessed slot on a surface which will be juxtaposed to the supporting surface of an opposing member. The recessed slot extends along the one surface of the one member and opens through an adjoining, intersecting surface of the same member. A screw or stud including an enlarged head is seated completely within the elongated recess. A clip member, having a raised section which includes a slot for receiving the enlarged head of the screw or stud, is secured on the opposite furniture member such that it protrudes in juxtaposition to the recessed slot. For assembly, no lateral openings or windows into the recessed slot are required. The shelf or other member including the recessed slot is slid over the clip member via the opening to the adjoining, intersecting surface such that the enlarged head of the screw or stud engages the slot of the clip member to hold the furniture members together.

In another arrangement of the invention, a second clip member for engaging the enlarged head of a second shouldered stud is secured in alignment with the first clip member on the same furniture member including the first clip. The second clip member includes a slot having openings at either end. Thus, a stud can slide completely through the second clip member in order to engage the slot of the first clip member. During assembly, the recessed slot including the multiple, spaced stud members therein is slid over the multiple, correspondingly spaced, clip members. The first stud passes completely through the double, open-ended clip member and comes to rest in the slot of the first clip member while the second stud member engages and comes to rest in the slot of the second clip member.

In any arrangement of the invention, the side walls of the recessed slot on the furniture member being inserted are guided by the closely adjacent side edges of the projecting clip member or members on the opposite furniture member. Such guidance prevents the member being inserted from skewing with respect to the support structure holding the clip member or members. Moreover, following assembly, the joint structure is concealed after assembly.

These and other objects, advantages, purposes, and features of the invention will become more apparent from a study of the following description taken in conjunction with the drawings.

BRIEF DESCRIPTION OF THE DRAWINGS

FIG. 1 is a perspective view of a furniture assembly including one arrangement of the fastening or joint system of the present invention;

FIG. 2 is a plan view of a pair of clip members forming a portion of the joint system shown in FIG. 1;

FIG. 3 is a fragmentary, sectional side elevation of the joint system of FIGS. 1 and 2 during assembly;

FIG. 4 is a fragmentary, sectional side elevation of the joint system of FIGS. 1, 2, and 3 following assembly;

FIG. 5 is a perspective view of one of the clip members shown in FIGS. 1–4 which includes a stud-receiving openings at both ends of its central, elongated slot;

FIG. 6 is a fragmentary, sectional side elevation of another arrangement of the joint system using the clip member of FIG. 5 to join a pair of furniture members while a third furniture member forms a stop along a common edge of the other furniture members;

FIG. 7 is a fragmentary, sectional end view of the furniture assembly taken along plane VII—VII of FIG. 4;

DESCRIPTION OF THE PREFERRED EMBODIMENTS

Figure 8:
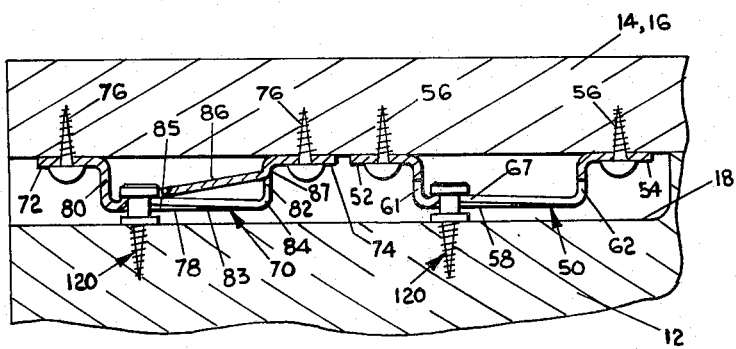
FIG. 8 is a fragmentary, sectional side elevation of another arrangement of the joint system using the clip member of FIG. 5.

Referring now to the drawings in greater detail, FIG. 1 illustrates a furniture assembly 10 using the fastening or joint structure of the present invention to secure individual shelves 12 between upstanding side support panels 14, 16. Each of the shelf members 12 includes elongated recessed slots 18 extending along end edges 20, 22. Slots 18 do not open at any point to lateral side surfaces 13, 15 of the shelves but do extend through at least one of the side edges 24 or 26 of the shelf which intersect end edges 20, 22. At least one shouldered stud or screw 28 is secured within each of the recessed slots 18 while a corresponding number of clip members 30, 50, 70, 90, or 140 are secured along the inside surfaces of the upstanding support panels 14, 16 to receive the stud or studs 28. As explained below, various combinations of the clip members 30, 50, 70, 90, or 140 may be used to secure the shelves 12. Slots 18 are slid over the aligned clip member or members with the shouldered studs engaging those clip members to secure the shelf in place. During assembly, the side walls of slots 18 engage the side edges of the protruding clip members, 30, 50, 70, 90, or 140 to guide the shelves and prevent skew. After assembly, the joint structure is concealed from view.

Generally, the present joint system uses at least one of four types of clip members 30, 50, 70, 90, or 140 (FIGS. 2, 4, 5, 9, 11, and 14). Clip members 30 and 70 are previously disclosed in prior U.S. Pat. No. 3,491,820 and U.S. Pat. No. 3,634,983 mentioned above, assigned to the same assignee as the present invention, the disclosures of which are hereby incorporated by reference herein. Clips 30 or 70 may be used in the present joint system with clips 50, 90 or 140 in varying combinations.

Each of the clip members 30, 50, 70, 90, or 140 is made from a one-piece metal plate and has first and second end flanges 32, 34, 52, 54, 72, 74, 92, 94, and 142, 144 for securing the clip to a surface of a furniture member. These end flanges include apertures therethrough for receiving securing screws, bolts, or other fasteners 36, 56, 76, or 96. Each of the clip members includes a raised central section 38, 58, 78, 98, or 148 offset from the plane including the end flanges thereof.

Specifically, in clip members 30 and 70 (FIGS. 2–4, 8, 10, and 11), elongated central portions 38 and 78 are supported above the end flanges thereof at one end through a solid wall member 40, 80, respectively, and at the other end through a pair of spaced, upstanding legs 41, 42 and 81, 82 forming stud-receiving openings therebetween. A slot 43, 83, respectively, generally parallel to the direction of elongation of the central portion is formed in each of the central portions. Slots 43 and 83 include a closed end and an open end, the closed end being at a point intermediate the ends of the central portions 38, 78. The open end extends into and communicates with an opening 44 or 84 between legs 41, 42 or 81, 82, respectively. Preferably, the closed end of the slot is nearest the solid wall 40, 80, respectively.

Clip member 70 primarily differs from clip member 30 by the inclusion of an integral, rectilinear, locking flange 86 (FIGS. 8 and 11) between upstanding legs 81, 82. The locking flange extends upwardly from the top of a short, upstanding wall portion 87 between legs 81, 82 to a point short of and slightly below the closed end of slot 83. Flange 86 permits the expanded head of a stud 120 to pass the end of the locking flange by depressing the locking flange as it passes into the closed end of the slot. The locking flange prevents removal of the stud from the closed end past the locking flange without first depressing the locking flange.

Figure 9:
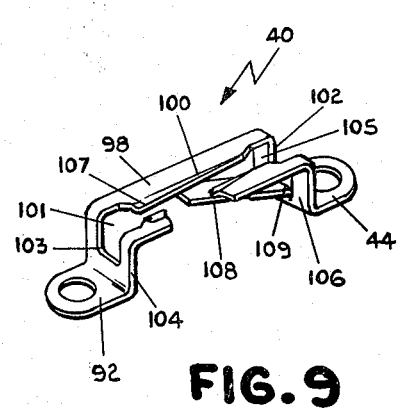
FIG. 9 is a perspective view of another embodiment of the double open-ended clip member similar to that of FIG. 5 but includes a locking flange with portions broken away to illustrate the locking flange.

As is best seen in FIGS. 5 and 9, clip members 50 and 90 primarily differ from clip members 30 and 70, respectively, by the inclusion of additional openings at the ends of the slots in their raised central sections. Thus, clips 50 and 90 include slots 60 and 100 extending lengthwise of the raised central section 58, 98 communicating with openings 61, 62 and 101, 102 at either end of the slots. Openings 61, 62 and 101, 102 are formed by upstanding leg members 63, 64, 65, 66, 103, 104, and 105, 106, respectively. Generally, openings 61, 62, 101, 102, as well as 44 and 84 in clip members 30 and 70, are sufficiently wide to allow entry of the enlarged head of a stud member but taper inwardly such that the slots 43, 60, 83, and 100 are only slightly wider than the shank portion of the stud adjacent and under the enlarged head. Preferably, each clip member includes recessed, offset wedging surfaces 45, 67, 85, 107 on either lateral side of the slots in the central section. The wedging surfaces taper downwardly from a point near the open end 44, 84 in clip members 30, 70 toward the closed end of the slots therein. In clip members 50, and 90, the wedging surfaces taper from one of the open ends toward the other along the sides of the slot. When the clips are attached to one panel 14, 16 and a stud 28 having an expanded head larger than the slot width is attached to a second shelf or member 12 within slot 18, the stud and furniture members will be drawn together as the stud is moved into the clip slot.

Clip member 90 differs primarily from clip member 50 by the inclusion of a locking flange 108 (FIG. 9) extending upwardly at an angle from a short upstanding wall 109 between legs 105, 106 to a point short of and slightly below the greatest offset of the depressed wedging surfaces along slot 100. Locking flange 108 is rectilinear like locking flange 86 mentioned above and functions similarly to prevent removal of a stud from slot 100 away from the greatest offset of wedging surfaces 107. Clip member 140 differs primarily from clip member 90 by the exclusion of the locking flange 108 and from clip member 50 by the inclusion of tapering sides on its central slot in its raised central section 148. Clip member 140 includes access openings, 150, 152 at either end of the central slot, which openings are slightly wider than the enlarged head of a stud 120 to be passed therethrough as described below. The openings 150, 152 themselves taper inwardly to an intermediate slot portion at points 154, 156. Intermediate points 154, 156, the sides of the slot taper gradually inwardly toward each other, reducing the normal width of the slot to a minimum width at point 158. At this point, the slot widens abruptly forming a wider slot portion 160. The side walls thus form steps 162, 164. At point 156, the central slot has a width slightly wider than that of the shaft of a stud immediately below the enlarged head of stud 120. Thus, the tapered portions of the slot form ramps which are cammed apart because of the resiliency of the material from which the clip is formed as the shaft of the stud is urged longitudinally from opening 152 through end 156 of the slot toward opening 150. As the shaft clears the minimum width at point 158, at steps 162, 164, the sides snap back to their normal position and resist withdrawal of the shaft toward opening 152. This prevents unintensional disengagement of the stud shaft from clip 140 unless sufficient force is generated to force the shaft back through the minimum width at point 158. Normal forces generated during use of the structure will not be sufficient to accomplish this, however.

Additionally, the size of the central slot including the tapered portions can be offset or recessed to provide recessed, offset wedging surfaces 166 on either lateral side of the slot in a manner similar to surfaces 45, 67, 85, and 107 for the clips mentioned above. The greatest recess or offset is provided in area 160 such that when the stud comes to rest in front of the steps 162, 164, the members to which the stud and clip member 140 are joined will be wedged tightly together by these wedging surfaces.

The above tapered slot concept is more fully described in U.S. Pat. No. 3,894,377, issued July 15, 1975, assigned to the same assignee as the present invention, entitled FASTENER CLIP, the disclosure of which is hereby incorporated by reference herein.

Each clip 30, 50, 70, 90, 140 is preferably made from a strong, resilient, metallic material such that the clip flexes via the upstanding legs at either or both open ends of the respective clip members. Such resiliency allows the clips to hold the stud members tightly to hold the furniture panels or members together securely over a long period of time.

As shown in the various figures, each individual clip member 30, 50, 70, 90, 140 is used with a mating, upstanding stud 120. Each stud includes a threaded portion 122, a shoulder flange 124, an enlarged head 126, and a shank portion 128 spacing head 126 from shoulder 124 (FIG. 4). Each of the enlarged heads of stud or screw members 120 have diameters slightly less than the width of the openings 44, 61, 62, 84, 101, or 102 in the various clip members. The diameter of shank portion 128 is slightly less than the width of slots 43, 60, 83, and 100. Shank portions 128 space the heads above the bottom of the recessed slots 18 in the shelving or furniture members to be connected by a predetermined distance calculated by the predetermined position of the shoulder flange 124. Hence, as shown in FIG. 4, when the stud members are threaded into the bottoms of the recesses 18 via the screw-driver slots 130 (FIG. 2), the shoulder flange 124 exactly positions the enlarged head 126 such that is is received by the slots of the various clip members.

Referring now to the various figures, the operation and assembly of the various forms of the joint or fastening system for furniture will be better understood. As shown in FIGS. 2–4, one method of utilizing the various clip member embodiments is to provide elongated, continuous recessed or slots 18 in the end edges of the shelf. A plurality of stud members 120 are threaded at spaced positions into the bottom of the recessed slot centrally between the upstanding side walls 12a, 12b (FIG. 7) of recesses 18. The depth of each recessed slot 18 is predetermined such that with the predetermined spacing of enlarged head 126 from shoulder flange 124 on each stud 120, enlarged head 126 will be in position to be received by the slots of the clip member but will not protrude above the plane of the surface in which the slot 18 is formed.

In FIGS. 2–4, a pair of clip members 30, 50 are positioned in alignment with one another along a surface of the upstanding panel or furniture member 14, 16 to be joined with shelf 12 in juxtaposition with the recessed slot 18. Clip members 30, 50 protrude beyond the surface of the furniture members 14, 16 and extend into the slot 18 as shown in FIGS. 3, 4 and 7. The width of slot 18 is slightly larger than the width of the clip members 30, 50 which have their respective slots in the raised, central sections aligned with one another. In the embodiment shown in FIGS. 2–4 and 7, clip member 50, having the double open ends 61, 62 is positioned ahead of clip member 30 having a closed end in its slot.

As shown in FIG. 3, when shelf 12, including the stud members 120 positioned within recessed slot 18 at distances spaced correspondingly to the spaced distances of clip members 30, 50, is passed over the clip members, the first stud 120 engages slot 60 of clip member 50 and passes or slides completely therethrough as assembly force is applied. As shown in FIG. 4, after the first stud 120 passes through clip member 50, it will enter the slot 38 in clip member 30 as the second stud enters slot 60 in clip member 50. As further assembly force is applied, the generally parallel side edges of each clip member maintain the alignment of the shelf with the slot 18 and guide the sliding assembly of the shelf with the upstanding side panels. Such skew prevention is also facilitated by the engagement of both studs within the slots of the spaced clip members.

Shelf 12 will come to rest when the shank portion 128 of the first or lead stud 120 engages the closed end of clip member 30 such that side edge 24 of shelf 12 and end edge 17 of upstanding panel 16 are in flush alignment (FIG. 4). The closed end of slot 38 in clip member 30 functions as a stop to exactly position the edges 17 and 24. Moreover, the wedge surfaces 45, 67 of the respective clip members, together with the yielding resiliency of the clip members themselves, serve to urge shelf 12 tightly against upstanding panel 16. The enlarged heads of the studs are come to rest at the greatest depth or offset of the recessed wedging surfaces such that the force urging the members together is at its greatest.

Another form of assembly of the furniture system uses a single clip member 50 secured to the inside surface of an upstanding panel or furniture member 16' as shown in FIG. 6. A single stud member 120 is positioned along the bottom of a recess 18'. When assembled, stud 28 is engaged by the slot 60 of clip member 50 and shelf 12' is urged against upstanding panel 16' by the wedge surfaces 67. Since clip member 50 does not include any closed end to serve as a stop, a back panel 19', secured to the rear edge 17' of panel 16', serves as an abutment or stop to limit the further movement of shelf 12'. Clip members 50 and stud 120 are so positioned such that when assembled, the enlarged head 126 of the stud member comes to rest at the greatest offset of wedge surfaces 67 to provide the greatest joining force.

Clip members 140 may also be used in a manner similar to that for clip member 50 as shown in FIGS. 2–4, 6, and 7. Clip member 140 is merely substituted for clip member 50 with the additional effect that the tapered slot including steps 162, 164 resists disassembly of the structure without sufficient force being provided for such disassembly. Thus, the clip member 140 can be used either alone as shown in FIG. 6 or in combination with clip members 30 as shown in FIGS. 2–4.

The assembly arrangements and clips shown in FIGS. 2–7 and 14 are intended for installation in areas where furniture may have to be disassembled for transportation, storage, etc. As shown in FIGS. 8–13, 10, and 11, other combinations of multiple numbers of clip members may be used to secure furniture panels together. In these cases, intended for permanent type installations which are not normally disassembled, at least one of the clip members includes a locking flange. If disassembly of the panels using the locking flange is to be provided for, a small aperture must be provided in the furniture at the side of the clip to allow the locking flange to be depressed. In FIG. 8, clip member 70 including locking flange 86 is the last clip member to be engaged by a stud member 120 during sliding assembly of the furniture panels. The lead stud 120 passes through clip 50 before being locked in clip 70.

Figure 10:
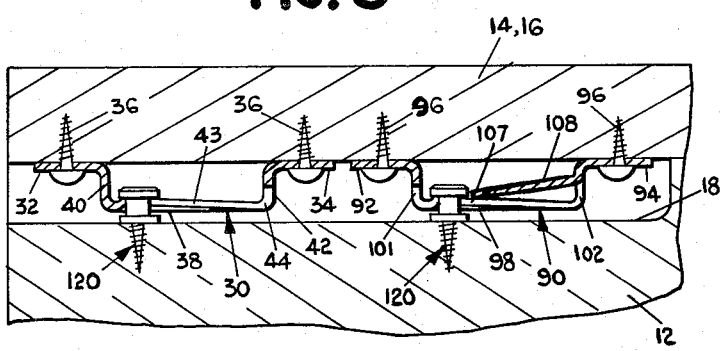
FIG. 10 is a fragmentary, sectional side elevation of an arrangement of the joint system using the clip member shown in FIG. 9.
Figure 14:
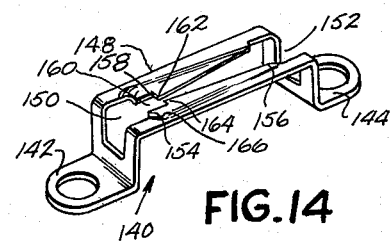
FIG. 14 is a perspective view of a clip member similar to FIG. 5 but including a tapered slot having a step therein which resists disassembly.
Figure 11:
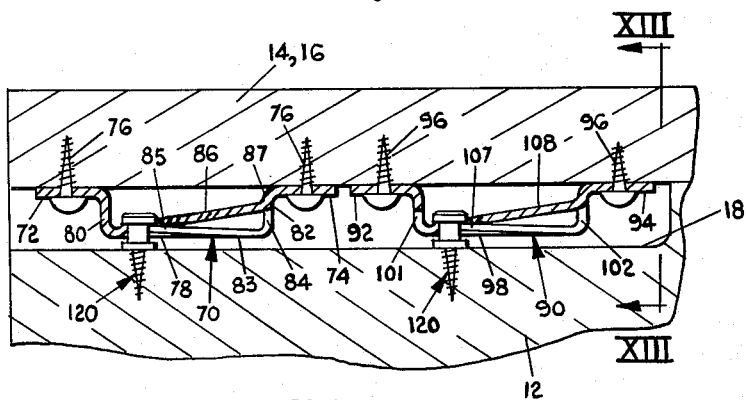
FIG. 11 is a fragmentary, sectional side elevation of another arrangement of the joint system including the clip member of FIG. 9.
Figure 13:
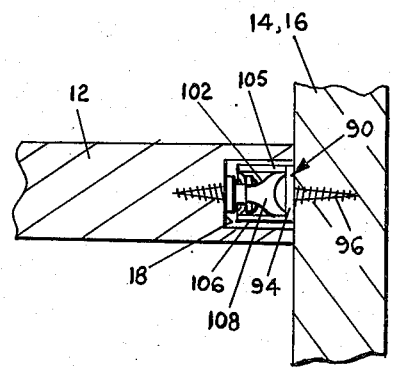
FIG. 13 is a fragmentary, sectional end view of the joint system taken along plane XIII—XIII of FIG. 11.

In FIG. 10, clip member 90 including double openings 101, 102 and locking flange 108 is positioned behind clip 30. Clip 90 allows the lead stud member to pass completely therethrough and engages the following stud member. Disassembly of the panels is prevented by engagement of locking flange 108 with the second or following stud member. In FIG. 11, a more secure locking arrangement is provided wherein clip members 70 and 90 both include locking flanges. Clip 90 is positioned behind clip 70 to allow passage of the lead stud 120 into clip 70. In either FIGS. 8, 10, or 11, clip member 140 can be substituted for clip members 50 or 90. In FIG. 10, clip member 130 can be replaced with one of the closed end clips having a tapered, stepped slot similar to clip 140 but described in U.S. Pat. No. 3,894,377 as mentioned above.

Figure 12:
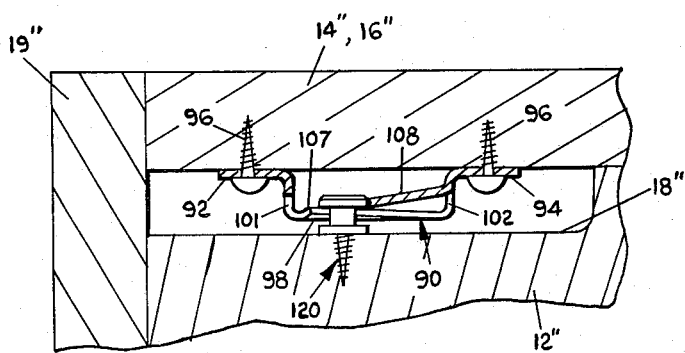
FIG. 12 is a fragmentary, sectional side elevation of a furniture assembly using only the clip member of FIG. 9.

In FIG. 12, another form of the invention includes a single clip member 90 having double openings, 101, 102 and locking flange 108 protruding into slot 18''. In this case, back panel 19'' provides a stop limiting further movement of shelf 12'' and causes the enlarged head of stud member 120 to come to rest at the greatest offset of the wedge surfaces 107. Locking flange 108 prevents disassembly of the assembled panels unless it is first depressed.

In each of the assembly forms, regardless of whether single or multiple clip members are used, the protrusion of the clip member into the recessed slot on the moving shelf 12 or other member provides a guide for preventing skewing or pivoting of the shelf during assembly. Such guidance is extremely helpful when the clip members are formed from sheet metal including a high bending strength and resiliency. When the stud members are forced through the double open-ended slots in clip members 50, 90 formed from such material, the use of the force necessary to slide the studs through the clips will not damage the assembly due to skew.

In each of the above assemblies, the depth of the recessed slot in which the stud members are secured is such that the enlarged head of the stud member will protrude only a distance slightly less than the depth of the openings 44, 61, 62, 84, 101, 102, 150, or 152 at the ends of the clip members extending in the opposite direction. Moreover, securing screws or fasteners, 36, 56, 76, and 96 include heads which do not protrude above the level of the bottom of those openings in the respective ends of the clip members. The stud members may thus pass through the entire length of clip members 50, 90, 140 and into the open ends of the next clip member without interference.

Following assembly, each of the joint systems is concealed from view. If a back panel such as 19' or 19'' is used, the only opening to the slot 18, 18', or 18'' is covered. Without use of such a back panel, the opening along the second, intersecting edge or surface of the shelf or other furniture panel member which allows the clip members to be slid into the slots 18 is normally positioned at the rear of the furniture assembly. Thus, it is out of view of any person viewing the front portion of the assembly.

It is possible within the concept of this invention to provide recessed slots 18 in the end edges of a shelf or other furniture panel member which extend the entire length of that edge such that they open through intersecting surfaces at either end of the end edge. In such case, the shelf member could be inverted and assembled. Alternatively, such shelf could be assembled by sliding it in either direction beginning at either end of the slot 18 as long as the clip members 30, 70 having the closed ends were positioned to be engaged last by the studs 120. Moreover, although the forms of the assembly shown herein are illustrated using either two or three clip members in alignment, the number of multiple clip members used to support a shelf will be dependent on the width of that shelf.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. A joint structure comprising:
   a first panel member and a second panel member having surfaces in contacting relationship;
   said second panel member having a recessed area along one surface which surface is in contact with said first panel member and said one surface opening into a second surface which intersects said one surface, said recessed area including a predetermined width, a bottom, and upstanding side walls;
   a stud member secured within said recessed area and including an enlarged head spaced above said bottom but below said one surface in contact with said first panel member such that no portion of said head extends beyond said one surface;

a resilient clip member and means for securing said clip member to a surface of said first panel member in contact with said second panel member and juxtaposed to said recessed area such that said clip member protrudes above said surface of said first panel member; said clip member being narrower than said width of said recessed area and including a raised central section having a slot extending therealong, and an opening to said slot at least at one end of said central section; said slot receiving said stud member with said enlarged head engaging the underside of said central section for urging said first and second panel members together along said surfaces; whereby when assembling said panel members, one of said panel members is moved relative to the other such that said clip member is brought within said recessed area for receipt of said stud within said slot, said walls of said recessed area guiding said clip member or vice versa such that said stud enters said slot and prevents skewing of said panel members with respect to each other during assembly;

said slot in said clip member opening at both ends of said central section, said clip being made of a strong resilient material so as to flex and provide a yielding force to said stud member as said stud member is forced into said slot; said structure including a stop means for limiting relative movement between said panel members such that said stud member is positioned along said slot in said clip member;

said recessed area includes a second stud member like the first stud member spaced from said first stud member within said recessed area; said first panel member including a second clip member; means for securing said second clip member in alignment with the first of said clip members; said second clip member also being narrower than said width of said recessed area and including a raised central section having a slot extending therealong for receiving the enlarged head of one of said stud members, and an opening to said slot at the end of said central section closest to said first clip member; said slot in said second clip member being aligned and generally parallel with said slot in said first clip member whereby during assembly of said panel members, said first stud member slides completely through said slot in said first clip member and comes to rest in said slot of said second clip member while said second stud member slides into and comes to rest within said slot of said first clip member, said walls of said recessed area guiding the engagement of said clip members and stud members together with the engagement of said stud members and slots to prevent skewing of said panel members during assembly.

2. The joint structure of claim 1 wherein each of said clip members includes a pair of securing flanges, one at either end of said central section, said central section of said clip member being integrally joined to said securing flanges by a pair of spaced, upstanding legs at either end of said central section; each pair of said legs forming an opening therebetween communicating with said slot; said openings between said legs being large enough to admit said enlarged head of said stud member.

3. The joint structure of claim 2 wherein each of said stud members includes a shank portion adjacent said enlarged head; said slot being narrower than said openings between said pairs of legs but slightly larger than said shank portion of said stud member such that said head is retained by portions of said central section on either lateral side of said slot.

4. The joint structure of claim 1 wherein said stop means includes abutment means on said first panel member for limiting sliding movement of said second panel member with respect to said first panel member.

5. The joint structure of claim 1 wherein said stop means include a closed end on said slot in said second clip member whereby said first stud member engages said closed slot end to limit relative movement between said panel members.

6. The joint structure of claim 5 wherein said central sections of each of said clip members include wedging surfaces at opposite, lateral sides of said slots therein; said wedging surfaces on each clip member tapering in the same direction toward one end of each respective clip member whereby said clip members and stud members are pulled tightly together as said panel members are joined by relative movement between said clip members and stud members.

7. The joint structure of claim 5 wherein each of said clip members includes a pair of securing flanges, one at either end of said central sections, respectively; at least one of said clip members further including an integral locking flange extending upwardly at an angle to said central portion from adjacent said securing flange at said open end to a point slightly below said slot to permit an expanded head of a stud to pass the end of said locking flange into said slot by depressing said locking flange as it passes thereinto, but to prevent removal of said stud from said slot past said locking flange without first depressing said locking flange.

8. The joint structure of claim 7 wherein said integral locking flange is included on said second clip member which includes a closed end at the end of its central slot further from said first clip member, said locking flange angling upwardly from adjacent said securing flange to a point short of and slightly below said slot closed end; said first clip member further including an integral locking flange extending upwardly at an angle to said central portion from adjacent said securing flange at said open end which is farthest from said second clip member to a point near and slightly below said slot in said central section to permit an expanded head of a stud to pass the end of said locking flange into said slot by depressing said locking flange, but to prevent removal of said stud from said slot past said locking flange without first depressing said locking flange.

9. The joint structure of claim 5 wherein said slot in said raised central section tapers from one opening at one of said ends toward the other end, the width of said slot decreasing gradually from a width greater than a portion of said stud to a minimum width and then abruptly increasing in width, said increased width slightly exceeding the diameter of said stud portion; and step means at said minimum width portion of said slot forming a lock resisting withdrawal of said stud in a direction toward said one end opening.

10. A joint structure comprising:
a first panel member and a second panel member having surfaces in contacting relationship;
said second panel member having a recessed area along one surface which surface is in contact with said first panel member and said one surface opening into a second surface which intersects said one surface, said recessed area including a predetermined width, a bottom, and upstanding side walls;

a pair of stud members secured within said recessed area at spaced positions therealong, each stud member including an enlarged head spaced above said bottom but below said one surface in contact with said first panel member such that no portion of either head extends beyond said one surface;

a pair of resilient clip members and means for securing each clip member to a surface of said first panel member in contact with said second panel member and juxtaposed to said recessed area such that said clip members protrude above said surface of said first panel member, each of said clip members being narrower than said width of said recessed area and including a raised central section having a slot extending therealong, and an opening to said slot at one end of said central section;

said slots in said clip members being aligned and generally parallel to one another with each slot receiving one of said stud members with its enlarged head engaging the underside of one of said central sections for urging said first and second panel members together;

at least one of said clip members having a second opening to said slot at the end of said central section opposite said one opening, such that the enlarged head of one of said stud members can pass completely through said slot and end openings, said one clip member which includes said slot which is open at both ends being the first to engage a stud member during assembly of said panel members; and stop means for limiting relative movement between said panel members whereby during assembly, one of said stud members passes completely through said slot in said one clip member and comes to rest in said slot of said other clip member when limited by said stop means, said other stud member entering and coming to rest in said slot of said one clip member, said walls of said recessed area guiding the engagement of said clip members and stud members together with the engagement of said stud members and slots to prevent skewing of said panel members during assembly.

11. The joint structure of claim 10 wherein said stop means includes a closed end on said slot in said other clip member.

12. The joint structure of claim 10 wherein at least one of said central sections of one of said clip members includes wedging surfaces at opposite, lateral sides of said slot, said wedging surfaces tapering toward one end of said central section whereby said clip member and stud member are pulled tightly together as said panel members are joined by relative movement between said clip member and stud member.

13. The joint structure of claim 10 wherein at least one of said clip members includes an integral locking flange extending upwardly at an angle to said central portion from adjacent said open end to a point slightly below said slot intermediate the ends of said central section to permit an expanded head of a stud to pass the end of said locking flange into said slot by depressing said locking flange as it passes into said slot but to prevent removal of said stud from said slot past said locking flange without first depressing said locking flange.

14. The joint structure of claim 10 wherein said slot in said central raised section of said one clip member tapers from one opening at one of said ends toward the other end, the width of said slot decreasing gradually from a width greater than a portion of said stud to a minimum width and then abruptly increasing in width, said increased width slightly exceeding the diameter of said stud portion; and step means at said minimum width portion of said slot forming a lock resisting withdrawal of said stud in a direction toward said one end opening.

* * * * *

UNITED STATES PATENT AND TRADEMARK OFFICE
CERTIFICATE OF CORRECTION

PATENT NO. : 3,996,718
DATED : December 14, 1976
INVENTOR(S) : R. Montgomery Welch It is certified that error appears in the above-identified patent and that said Letters Patent are hereby corrected as shown below:

Column 1, line 25;

"include" should be --includes--;

Column 2, line 59;

After "includes", delete "a";

Column 3, line 6;

"includes" should be --including--;

Column 6, line 1;

"is" (first occurrence) should be --it--;

Column 6, line 8;

"recessed" should be --recesses--.

Signed and Sealed this

Twenty-sixth Day of April 1977

[SEAL]

Attest:

RUTH C. MASON
Attesting Officer

C. MARSHALL DANN
Commissioner of Patents and Trademarks